US012643524B2

(12) United States Patent
Hayes et al.

(10) Patent No.: US 12,643,524 B2
(45) Date of Patent: Jun. 2, 2026

(54) PARK BRAKE SYSTEM AND METHOD FOR CORROBORATED PRESSURE REPORTING

(71) Applicant: Bendix Commercial Vehicle Systems LLC, Avon, OH (US)

(72) Inventors: Thomas J. Hayes, Lakewood, OH (US); Daniel P. Zula, Ridgeville, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 508 days.

(21) Appl. No.: 18/133,148

(22) Filed: Apr. 11, 2023

(65) Prior Publication Data

US 2024/0343241 A1     Oct. 17, 2024

(51) Int. Cl.
*B60T 17/22* (2006.01)
*B60W 60/00* (2020.01)

(52) U.S. Cl.
CPC ........... *B60T 17/22* (2013.01); *B60W 60/001* (2020.02); *B60W 60/0053* (2020.02); *B60T 2270/402* (2013.01); *B60T 2270/413* (2013.01); *B60T 2270/88* (2013.01); *B60W 2510/182* (2013.01)

(58) Field of Classification Search
CPC .............. B60T 17/22; B60T 2270/402; B60T 2270/413; B60T 2270/88; B60T 13/66; B60W 60/0053; B60W 60/001; B60W 2510/182
USPC .......................................................... 701/23
See application file for complete search history.

(56) References Cited

U.S. PATENT DOCUMENTS

| | | | |
|---|---|---|---|
| 9,563,523 B2 | 2/2017 | Fuhrman et al. | |
| 2019/0193708 A1 | 6/2019 | Kordik et al. | |
| 2020/0070788 A1 | 3/2020 | Michels et al. | |
| 2021/0277995 A1 | 9/2021 | Hutchins et al. | |
| 2024/0317197 A1* | 9/2024 | Zhang ................... | B60T 8/885 |

FOREIGN PATENT DOCUMENTS

| | | | |
|---|---|---|---|
| CN | 106627555 A | * | 5/2017 |
| CN | 106627555 B | | 8/2019 |
| CN | 216349601 U | | 4/2022 |

OTHER PUBLICATIONS

Ma Y, et al "Parking brake redundancy monitor and diagnosis system and control method of same" Machine translation of CN-106627555-A from Espacenet (Year: 2017).*

(Continued)

*Primary Examiner* — Anne Marie Antonucci
(74) *Attorney, Agent, or Firm* — Crowell & Moring LLP

(57) ABSTRACT

A park brake system and method for corroborated pressure reporting are provided. In one example implementation, primary and redundant park brake controllers read their respecting pressure sensors along an air channel to a parking brake. The controllers exchange the sensor readings, and each controller determines whether or not the sensor readings are in agreement. The controllers provide their determinations to an automated driving system. If the sensor readings are not in agreement, the automated driving system can partially or completely disengage or take some other action. Other implementations are provided.

21 Claims, 5 Drawing Sheets

(56)        References Cited

OTHER PUBLICATIONS

"Functional Safety Delivered: End-to-End Development of an ASIL-D
Compliant Electronic Braking ECU"; story of Embitel providing
development of electronic brake ECU; Embitel; downloaded from
the Internet on Mar. 13, 2023 at https://www.embitel.com/automotive-
casestudies/functional-safety-asil-d-for-electronic-braking-system; Jul.
15, 2021; 5 pages.
International Search Report mailed Jul. 29, 2024 for International
Application No. PCT/US2024/020717.
Written Opinion mailed Jul. 29, 2024 for International Application
No. PCT/US2024/020717.

* cited by examiner

FIG. 3C

PARK BRAKE SYSTEM AND METHOD FOR CORROBORATED PRESSURE REPORTING

BACKGROUND

Some heavy-duty commercial vehicles configured for towing a trailer can be equipped with an automated driving system that provides full or partial automatic control over acceleration, steering, and/or braking of the vehicle. The Automotive Safety Integrity Level (ASIL) is an industry standard for classifying safety requirements for vehicles with automated driving systems. ASIL D contains the highest level of safety requirements, where a violation of those requirements can result in life-threatening or fatal injuries. Such requirements can relate to the brake system of the vehicle.

BRIEF DESCRIPTION OF THE DRAWINGS

FIGS. 3A-3C are parts of a flow chart of a method of an embodiment for corroborated pressure reporting.

SUMMARY

The following embodiments generally relate to a park brake system and method for corroborated pressure reporting. In one embodiment, a park brake system is provided comprising: a first park brake controller configured to receive a first pressure sensor reading from a first pressure sensor in a vehicle; and a second park brake controller configured to receive a second pressure sensor reading from a second pressure sensor in the vehicle; wherein: the first park brake controller is further configured to receive the second pressure sensor reading from the second park brake controller; the second park brake controller is further configured to receive the first pressure sensor reading from the first park brake controller; and each of the first and second park brake controllers is further configured to compare the first and second pressure sensor readings and transmit a result of the comparing to an automated driving system of the vehicle.

In another embodiment, a method is provided that is performed in a vehicle comprising a park brake, pressure sensors along an air channel to the park brake, and at least one virtual driver. The method comprises: determining whether readings from the pressure sensors are in agreement; in response to determining that the readings from the pressure sensors are in agreement, causing the at least one virtual driver to operate in a first mode; and in response to determining that the readings from the pressure sensors are not in agreement, causing the at least one virtual driver to operate in a second mode.

In yet another embodiment, a park brake system is provided comprising: means for detecting a pressure difference in a flow of air to a park brake of a vehicle; and means for informing an automated driving system of the vehicle of the detected pressure difference.

Other embodiments are possible, and each of the embodiments can be used alone or together in combination.

DETAILED DESCRIPTION

Figure 1:
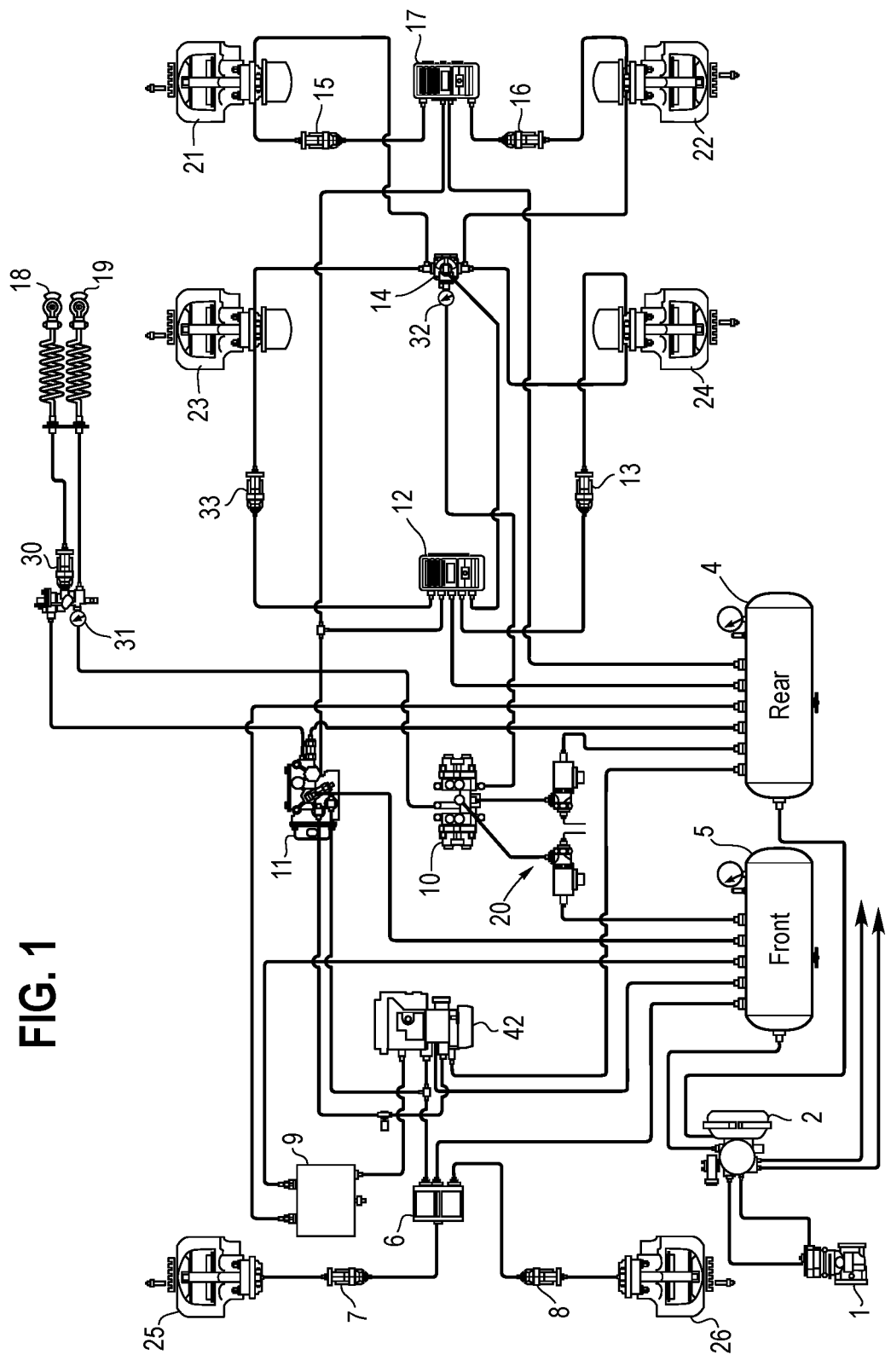
FIG. 1 is a pneumatic diagram of a brake system of a vehicle of an embodiment.

FIG. 1 is a pneumatic diagram of a brake system of an embodiment for use in a vehicle (e.g., a tractor or truck) that is capable of towing a trailer. It should be understood that this is merely an example and that other/different components can be used. In this example, the tractor has a rear drive axle, a front undriven (steer) axle (more than one steer axle can be used), and one or more optional axles. It is important to note that while a tractor/truck is used in this example, these embodiments can also be applied in other vehicles.

As shown in FIG. 1, in this embodiment, the brake system comprises an air compressor 1, an air dryer 2, and rear and front air tanks 4, 5. The air compressor 1 provides compressed air to the air dryer 2, which supplies dried, compressed air to the rear and front air tanks 4, 5, which supply compressed air to the service brakes and the parking brakes, as discussed below. Compressed air can also be supplied to the transmission and accessories of the vehicle, as represented by the two arrows at the bottom of FIG. 1.

Other components of the brake system of this embodiment include electro-pneumatic modules (EPMs) 6, 12, 17; modulators 7, 8, 13, 15, 16, 33; a brake booster 9; a park valve modulator 10 having as associated primary park brake controller (not shown) with two pressure sensors; an electronic trailer controller module 11; a quick release valve 14; pneumatic control and supply lines 18, 19 configured to connect to a trailer; a redundant valve control 20 having an associated park brake controller (not shown); air disc brakes 21, 22, 23, 24, 25, 26; a tractor protection valve 30; pressure sensors 31, 32; and foot brake module (FBM) 42.

As mentioned above, the brake system of this embodiment can be used for service braking and parking the vehicle. In general, for service braking, when a driver presses the brake pedal of the FBM 42 or when a virtual driver requests braking, electronic signals representing the requested deceleration are sent to the EPMs 6, 12, 17 to apply the appropriate amount of pressure needed to achieve that deceleration given various variables, such as, but not limited to, vehicle weight, weight distribution, whether a trailer is present, and driving conditions. In an electronic braking system (EBS), relays and modulators on an axle can be combined into an EPM, which is capable of electronically applying, holding, and releasing air supplied form the front and rear tanks 3, 4 to decelerate a wheel end of the axles. Pneumatic signals for braking can be applied to the trailer via the pneumatic control and supply lines 18, 19.

The primary park brake controller (sometimes referred to herein as the first controller or the primary electronic parking brake (pEPB)) and the redundant park brake controller (sometimes referred to herein as the second controller or the redundant electronic control unit (rECU)) are used in parking/un-parking the vehicle. In general, a "controller" can comprise one or more processors that can execute computer-readable program code having instructions (e.g., modules, routines, sub-routine, programs, applications, etc.) that, when executed by the one or more processors, cause the one or more processors to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof, some or all of which can be located internal to or external to the controller. The one or more processors can also take the form of a purely-hardware implementation (e.g., an application-specific integrated circuit (ASIC)).

In this embodiment, park brake springs are used that are biased to apply pressure on braking components at the wheel ends. When the park brakes of the vehicle are applied, the primary park brake controller provides signals to the park brake valves to exhaust air in one or more chambers of spring brake chambers. When air in the spring brake chambers is exhausted and system air pressure drops below a threshold (e.g., to less than about 25 psi to 45 psi), the parking brake springs are activated to apply the vehicle park brakes.

The primary park brake controller can provide a signal to control the parking brake valve in response to a (human or virtual) driver demand to un-park the vehicle (e.g., when a human driver pushes a park/un-park button in the vehicle). To release the park brake, compressed air needs to flow from the rear or front tanks 4, 5 into the spring brake chambers to apply pneumatic pressure to the parking brake springs to release them from the braking position. The supply of compressed air from the rear or front tanks 4, 5 to the spring brake chambers to release the parking brake is regulated by a parking brake valve that is controlled by the primary park brake controller.

The redundant park brake controller is used in case there is a malfunction or other problem that prevents the primary park brake controller from working correctly to exhaust air in the spring brake chambers to activate the park brake springs to park the vehicle. More specifically, in this embodiment, the redundant park brake controller comprises at least one processor and solenoid valve(s). When the at least one processor in the redundant park brake controller detects or is informed of a problem with the primary park brake controller, the redundant park brake controller can close the solenoid valve(s) to starve the air supply of the park valve modulator 10, isolating it from the air tanks 3, 4, exhausting the remaining pressure in the park brake system, and applying the park brake. Also, instead of the primary parking brake system un-parking the vehicle and the redundant system parking the vehicle, in another embodiment, the primary park brake system parks/un-parks the vehicle, and the redundant system only parks (and does not un-park) the vehicle.

Figure 2:
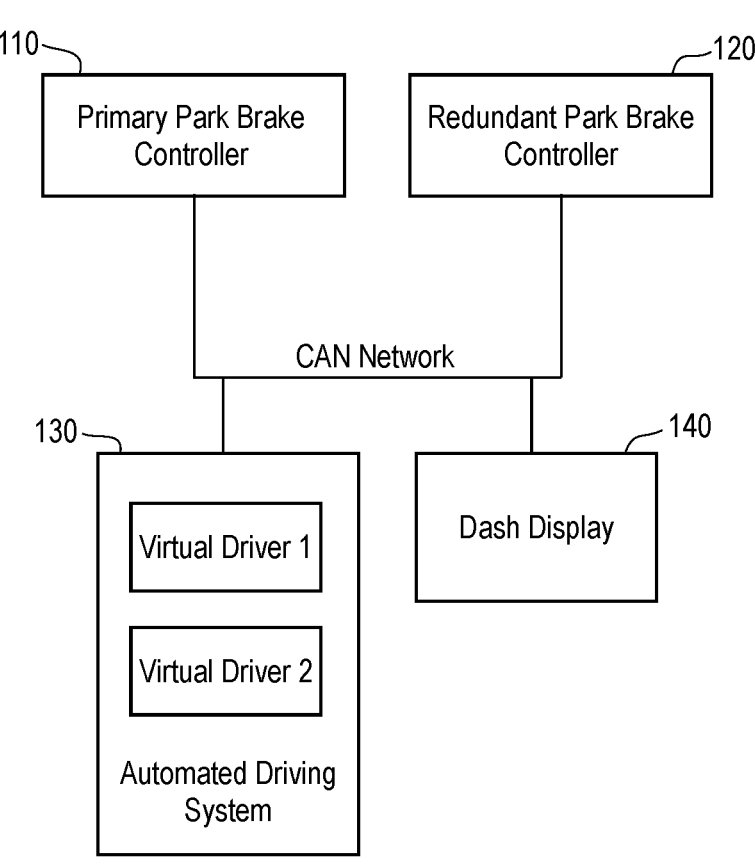
FIG. 2 is a block diagram of a communications network of a vehicle of an embodiment.

As shown in FIG. 2, the primary and redundant park brake controllers 110, 120 can communicate with each other via a controller area network (CAN). While not shown in FIG. 2 to simplify the drawings, redundant communication lines can be used. Also, it should be noted that while a CAN is used in this example, any suitable communications mechanism, wired or wireless, can be used. In this embodiment, the primary and redundant park brake controllers 110, 120 also communicate with other components in the vehicle, such as an automated driving system 130 and a dash display 140. The dash display 140 can provide audio and/or visual information to a human driver or occupant of the vehicle. The automated driving system 130 comprises one or more processors that can execute computer-readable program code to provide fully automatic or partially automatic control over the acceleration, steering, and/or braking of the vehicle. As used herein, a "virtual driver" refers to an instantiation of a computer mechanism for providing such control. The automated driving system 130 can also be implemented exclusively with hardware (e.g., an ASIC).

In this embodiment, the automated driving system 130 contains two virtual drivers (primary and secondary) for redundancy. (In other embodiments, one virtual driver is used or more than two virtual drivers are used.) Such redundancy may be desired since autonomous driving may be a safety-critical system per the Automotive Safety Integrity Level (ASIL) standard. ASIL is an industry standard for classifying safety requirements for automated driving systems, and ASIL D contains the highest level of safety requirements and is directed to situations that may result in life-threatening or fatal injuries if there is a malfunction in the automated driving system 130.

In one embodiment, the primary and redundant park brake controllers 110, 120 are used to provide an assurance that the vehicle can be reliably parked or to trigger certain actions to ensure the vehicle is parked. In general, the primary and redundant park brake controllers 110, 120 can read air pressure readings from their respective pressure sensors, communicate the air pressure readings with the other controller 110, 120, compare the pressure sensor readings, and transmit a message to the automated driving system 130 regarding the results of that comparison. Confirming the pressure status of the truck and trailer park brake systems can help maintain the ASIL D status needed for autonomous vehicles.

More specifically, in one embodiment, after the primary and redundant park brake controllers 110, 120 both initialize, they can take pressure readings of their associated pressure sensors. It may be desired to place both sets of pressure sensors on the same air lines (e.g., hoses or, more generally, air channels) close to each other to prevent faulty readings. In this embodiment, the primary brake controller 110 has pressure sensors built-in to its output ports connected to air lines that provide control air to the tractor's and trailer's park brakes, and the redundant brake controller 110 uses pressure sensors 31, 32 at distal outputs of air circuits operated by the air lines. Of course, this is just an example, and other configurations can be used.

Once each controller 110, 120 takes initial readings of its associated pressure sensors and the values are stable for both the tractor and the trailer, the primary and redundant park brake controllers 110, 120 can communicate these pressure readings with each other via the CAN. Each of the primary and redundant park brake controllers 110, 120 can then compare the received values from the other controller with its own readings. The primary and redundant park brake controllers 110, 120 can also use other messages, such as, but not limited to, active parking requests, controller status for primary or redundant control, and presence or lack of a trailer. Each of the primary and redundant park brake controllers 110, 120 then sends a message on the CAN indicating whether or not it finds the two sets of readings to be in agreement ("in agreement" can be within a tolerance level).

The agreement or disagreement of the controllers 110, 120 will let the automated driving system 130 decide what action to take. For example, if the readings match, that indicates that there is no problem in at least the monitored portion of the park brake air circuit. So, the automated driving system 130 can decide to start a driving mission (e.g., in a fully-autonomous mode of operation). On the other hand, if there is a mismatch in the readings, this can indicate a hole in at least one of the air lines in the circuit or a defect in at least one of the monitoring devices, in which case the automated driving system 130 can operate in a different, more restrictive mode of operation. For example, the automated driving system 130 can decide to require the human driver to start the mission, to detour the vehicle for possible servicing, or to provide additional checks to make sure the vehicle is actually parked (e.g., by releasing the service brake and using a wheel speed sensor, a global position satellite (GPS) reading, or a camera to detect any movement of the vehicle).

There is also a possibility that one of the controllers 110, 120 is malfunctioning and not able to confirm the vehicle status the other controller 110, 120. In this case, a controller can report out the information it knows but as a single reporter only, affecting the automated driving system's decisions depending on which controller 110, 120 is doing the single reporting. The automated driving system 130 may decide, for example, to not begin a mission or to restrict the system to only operate with a human driver until the system functionality is restored. Also, the automated driving system 130 can decide to take different actions depending on the level of loss (e.g., a disagreement or a single reporter). For example, if only one controller 110, 120 is working, the automated driving system 130 may not have the required level of confidence that the vehicle is parked.

As noted above, if the primary park brake controller 110 and the redundant park brake controller 120 are exchanging information indicated the same or very similar (i.e., within 5%) pressures, they can set their status to an agreement with the respective pressure state; either exhausted or charged. However, if the system pressure is changing, the messaging can state that and indicate that it is in an intermediary stage. In one embodiment, an agreement can only be reached once the system is stable.

Figure 3A:
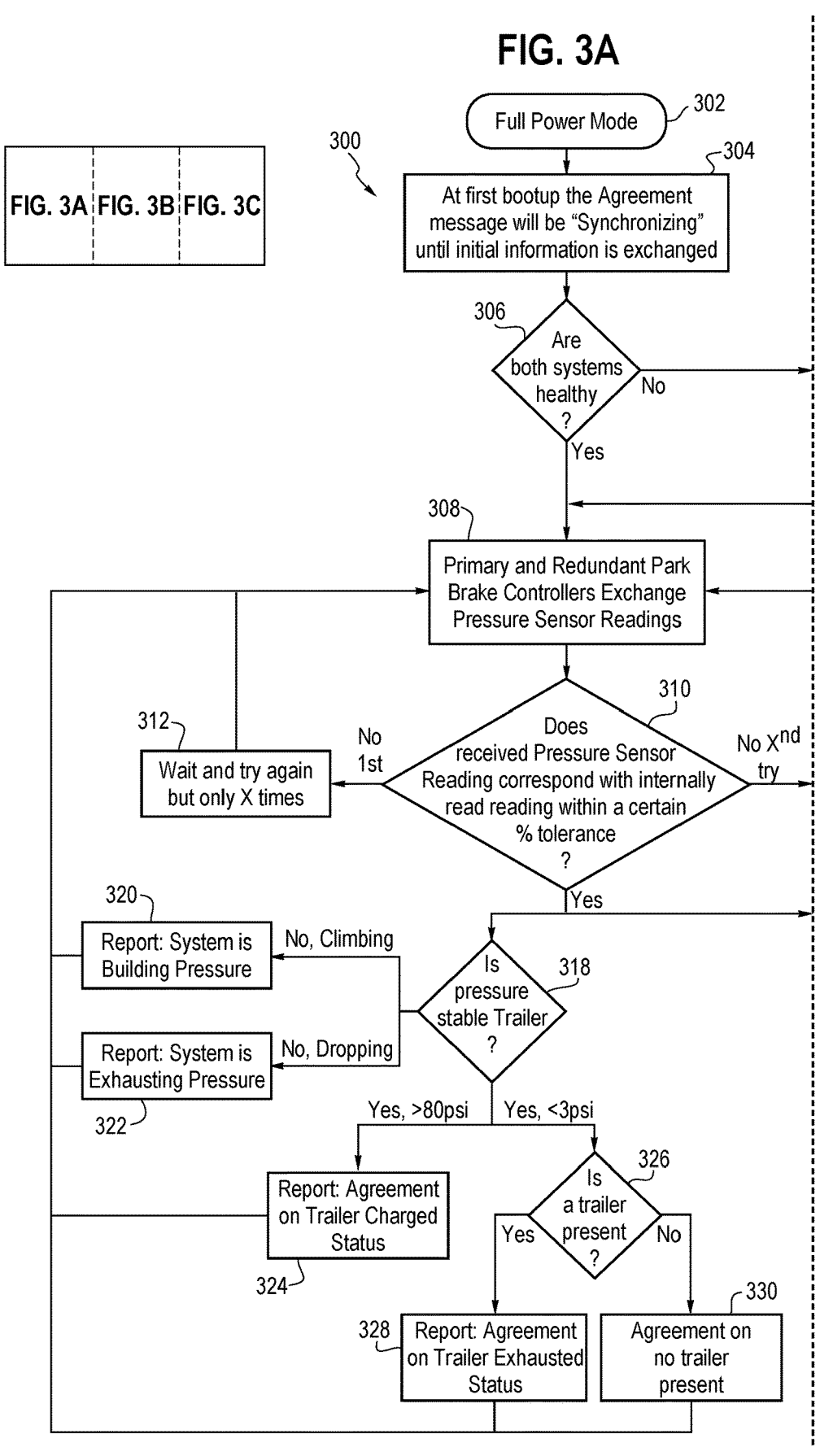
Figure 3B:
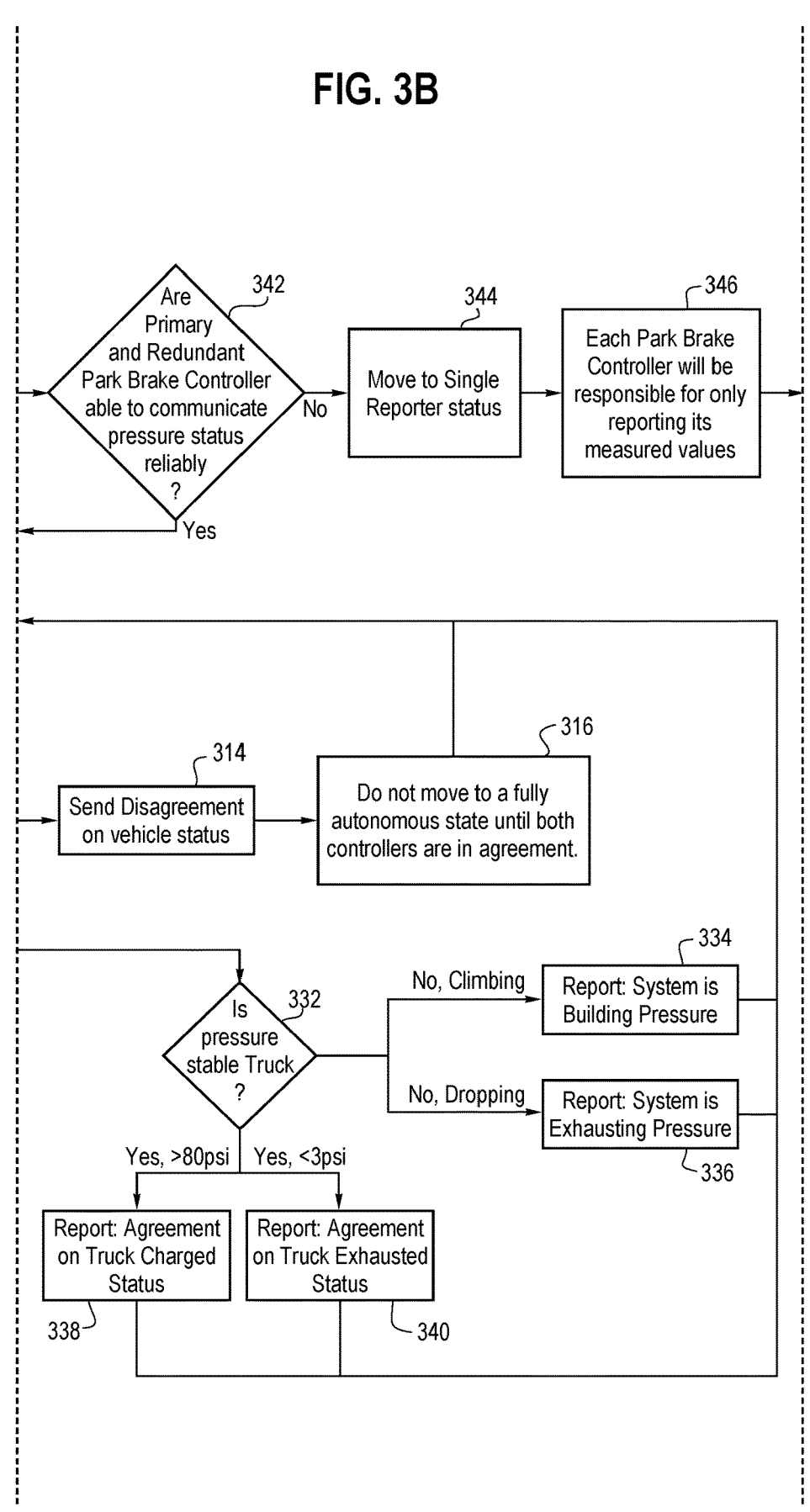
Figure 3C:
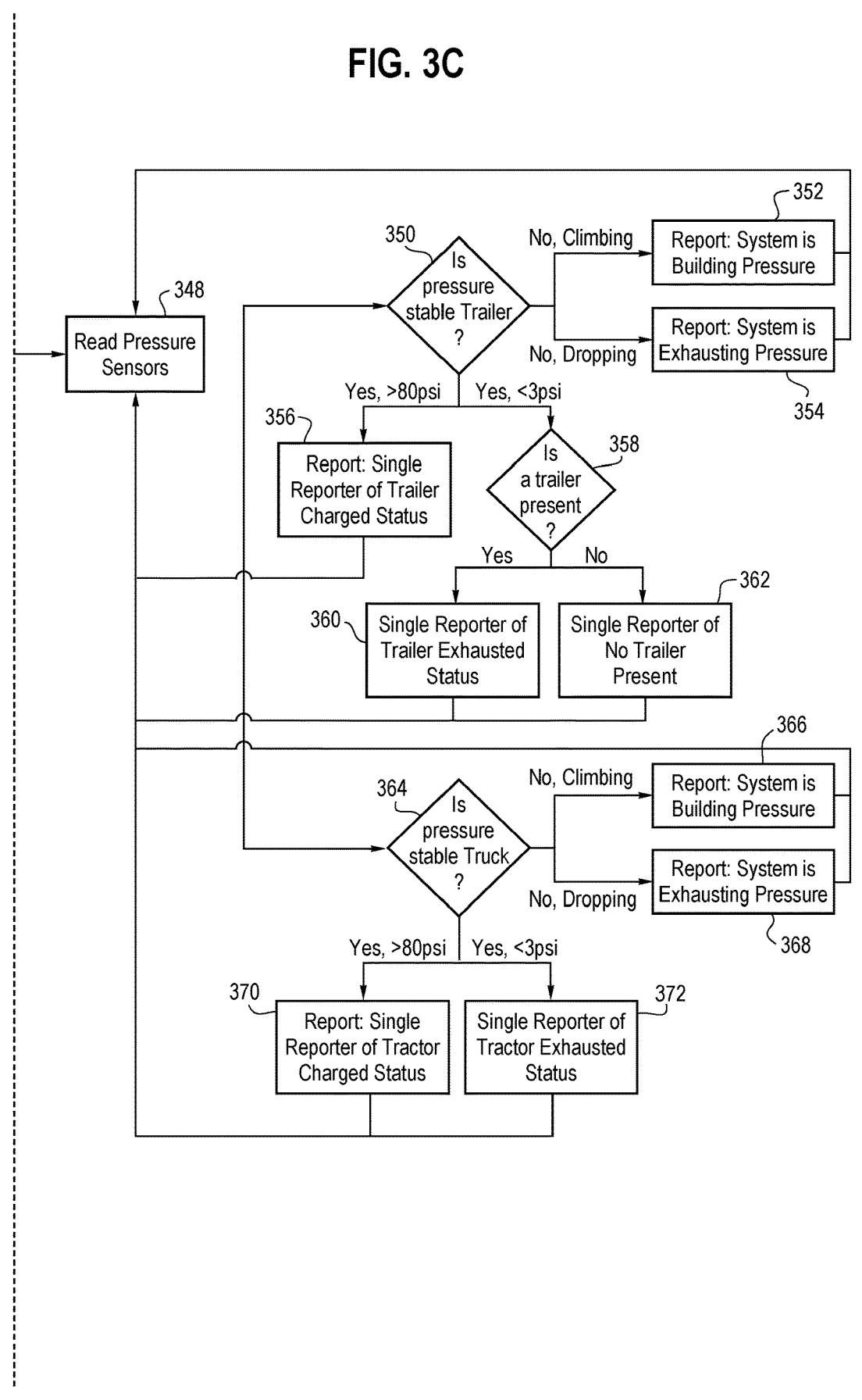

FIGS. 3A-3C is a flow chart 300 of a method for corroborated pressure reporting of an embodiment. As shown in FIGS. 3A-3C, when the park brake system enters full power mode (e.g., when the system is on-line and not in a sleep state) (act 302), the primary and redundant park brake controllers 110, 120 broadcast a message that indicates that they are synchronizing (act 304). The primary and redundant park brake controllers 110, 120 then determine if they are "healthy" (e.g., if the controllers 110, 120 are working according to their specifications) (act 306). For example, one or more of the primary and redundant park brake controllers 110, 120 can perform an internal diagnostic check (e.g., by sending check pulses to its pressure sensor(s)).

If both the primary and redundant park brake controllers 110, 120 are healthy, the primary and redundant park brake controllers 110, 120 receive the pressure reading(s) from their associated pressure sensor(s) and exchange that information with each other (act 308). Each of the primary and redundant park brake controllers 110, 120 then compares the received pressure sensor reading from the other controller with its own pressure sensor to determine if the readings match/correspond (e.g., within a certain tolerance level, such as about 5%) (act 310). If the pressure sensor reading do not match, the primary and redundant park brake controllers 110, 120 can wait a period of time and try again (act 312). If the pressure sensors readings do not match after a certain number of times, the primary and redundant park brake controllers 110, 120 can transmit a message to the automated driving system 130 that there is a disagreement on the vehicle status (act 314). In response, the automated driving system 130 may not transition to a fully autonomous state (act 316).

If the pressure sensor readings match, each controller 110, 120 then determines if the pressure is stable in the trailer and truck/tractor (acts 318 and 332). If the pressure is not stable in the trailer, the pressure may be climbing or dropping. In those situations, the controller can report that the system is building pressure (act 320) or exhausting pressure (act 322), respectively. If the pressure is stable in the trailer, the pressure may be high enough (e.g., above a first threshold, such as above about 80 psi) to indicate a charged status, in which case the controller reports agreement on the trailer charged status (act 324). If the pressure is below a second threshold (e.g., below about 3 psi), the controller can determine if a trailer is present (act 326). This can be done in any suitable way, such as by getting a trailer presence signal from the trailer or detecting air pressure on another air line to the trailer. If a trailer is present, the controller can report agreement on the trailer exhausted status (act 328). Otherwise, the controller can report agreement on no trailer present (act 330).

Turning now to the truck pressure, if the pressure is not stable in the truck (act 332), the pressure may be climbing or dropping. In those situations, the controller can report that the system is building pressure (act 334) or exhausting pressure (act 336), respectively. If the pressure is stable in the truck, the pressure may be high enough (e.g., above a first threshold, such as above about 80 psi) to indicate a charged status, in which case the controller reports agreement on the truck charged status (act 338). If the pressure is below a second threshold (e.g., below about 3 psi), the controller can report agreement on the truck exhausted status (act 340).

Returning back to act 306, if either the primary and redundant park brake controllers 110, 120 are not healthy, a determination is made as to whether the primary and redundant park brake controllers 110, 120 can communicate pressure status reliably (act 340). If they can, act 308 is performed, as discussed above. However, if they cannot, the system is moved to a single reporter status (act 344). At that point, each of the primary and redundant park brake controllers 110, 120 are responsible for only reporting their measured values and not for comparing values (act 346). So, each controller 110, 120 would then read its associated pressure sensors (act 358) and determine if the pressure is stable in the trailer and tractor (acts 350 and 364). If the pressure is not stable in the trailer, it may be climbing or dropping. In those situations, the controller can report that the system is building pressure (act 352) or exhausting pressure (act 354), respectively. If the pressure is stable in the trailer, the pressure may be high enough (e.g., above a first threshold, such as above about 80 psi) to indicate a charged status, in which case the controller reports agreement on the trailer charged status (act 356). If the pressure is below a second threshold (e.g., below about 3 psi), the controller can determine if a trailer is present (act 358). This can be done in any suitable way, as mentioned above. If a trailer is present, the controller can report agreement on the truck exhausted status (act 360). Otherwise, the controller can report agreement on no trailer present (act 362).

Turning now to the tractor pressure, if the pressure is not stable in the truck, the pressure may be climbing or dropping. In those situations, the controller can report that the system is building pressure (act 366) or exhausting pressure (act 368), respectively. If the pressure is stable in the tractor the pressure may be high enough (e.g., above a first threshold, such as above about 80 psi) to indicate a charged status, in which case the controller reports agreement on the truck charged status (act 370). If the pressure is below a second threshold (e.g., below about 3 psi), the controller can report agreement on the truck exhausted status (act 372).

There are many alternatives that can be used with these embodiments. For example, in another embodiment, a vehicle has a single park brake circuit, with no park brake circuit for the trailer. That is, the whole vehicle has a single brake circuit, which can be the case, for example, for certain tractor/trailers in some European and other countries, certain trucks without trailers, and certain school busses. In this embodiment of a single park brake circuit, there can be a total of two pressure sensors-one in the primary park brake controller, and another in the redundant controller.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A park brake system comprising:
a first park brake controller configured to receive a first pressure sensor reading from a first pressure sensor in a vehicle; and
a second park brake controller configured to receive a second pressure sensor reading from a second pressure sensor in the vehicle;
wherein:
the first park brake controller is further configured to receive the second pressure sensor reading from the second park brake controller;
the second park brake controller is further configured to receive the first pressure sensor reading from the first park brake controller;
each of the first and second park brake controllers is further configured to compare the first and second pressure sensor readings and transmit a result of the comparing to an automated driving system of the vehicle;
the automated driving system of the vehicle is configured to operate in a first mode in response to the first and second pressure sensor readings being in agreement;
the automated driving system of the vehicle is configured to operate in a second mode in response to the first and second pressure sensor readings not being in agreement.

2. The park brake system of claim 1, wherein the first and second pressure sensors are along an air flow to one of a tractor park brake and a trailer park brake.

3. The park brake system of claim 2, further comprising an additional set of pressure sensors along an air flow to the other one of the tractor park brake and a trailer park brake.

4. The park brake system of claim 1, wherein the first and second park brake controllers are in a single brake circuit.

5. The park brake system of claim 1, wherein the automated driving system is configured to perform one or more of the following in response to receiving the result: determine whether to start a driving mission, determine whether to detour the vehicle for servicing, determine whether to require a human driver to operate the vehicle, and determine whether to verify a park status of the vehicle.

6. The park brake system of claim 1, wherein each of the first and second park brake controllers is further configured to transmit its associated pressure sensor reading to the automated driving system in response to failing to receive a pressure sensor reading from the other one of the first and second park brake controllers.

7. The park brake system of claim 6, wherein the automated driving system is configured to a take different action depending on which one of the first and second park brake controllers failed to report its pressure sensor reading.

8. The park brake system of claim 1, wherein the result indicates a match in response to the first and second pressure sensor readings being within a tolerance level.

9. The park brake system of claim 8, wherein the tolerance level is about 5%.

10. The park brake system of claim 1, wherein the result indicates one of the following: disagreement on vehicle status, agreement on trailer charged status, agreement on trailer exhausted status, agreement on truck charged status, agreement on truck exhausted status, and agreement on no trailer present.

11. The park brake system of claim 1, wherein the first and second park brake controllers are further configured to communicate with each other and the automated driving system via a controller area network (CAN).

12. A method comprising:
performing in a vehicle comprising a park brake, pressure sensors along an air channel to the park brake, and at least one virtual driver:
determining whether readings from the pressure sensors are in agreement;
in response to determining that the readings from the pressure sensors are in agreement, causing the at least one virtual driver to operate in a first mode; and
in response to determining that the readings from the pressure sensors are not in agreement, causing the at least one virtual driver to operate in a second mode.

13. The method of claim 12, wherein the determining is performed by primary and redundant park brake controllers.

14. The method of claim 13, further comprising informing the at least one virtual driver when only one of the primary and redundant park brake controllers is reporting its pressure sensor reading.

15. The method of claim 13, wherein the first and second park brake controllers are in a single brake circuit.

16. The method of claim 12, wherein the park brake comprises one of a tractor park brake and a trailer park brake, and wherein the method is repeated for the other one of the tractor park brake and the trailer park brake.

17. The method of claim 12, wherein, in the first mode, the at least one virtual driver is in a fully-autonomous state.

18. The method of claim 12, wherein, in the second mode, the at least one virtual driver is configured to perform one or more of: detouring the vehicle for servicing, requiring a human driver to operate the vehicle, and verifying a park status of the vehicle.

19. The method of claim 12, further comprising reporting one or more of following to the at least one virtual driver: disagreement on vehicle status, agreement on trailer charged status, agreement on trailer exhausted status, agreement on truck charged status, agreement on truck exhausted status, and agreement on no trailer present.

20. A park brake system comprising:

means for detecting a pressure difference in a flow of air to a park brake of a vehicle by determining whether pressure sensor readings are in agreement; and means for informing an automated driving system of the vehicle of the detected pressure difference, wherein the detected pressure difference prevents the automated driving system from engaging in a fully-autonomous mode.

21. The park brake system of claim 20, further comprising a primary electronic parking brake and a redundant electronic control unit, wherein the means for detecting and the means for informing are in both the primary electronic parking brake and the redundant electronic control unit.

* * * * *